United States Patent [19]

Sommer

[11] Patent Number: 5,566,805
[45] Date of Patent: Oct. 22, 1996

[54] VACUUM OPERATED SPEED RANGE SHIFTING MECHANISM

[75] Inventor: Randy L. Sommer, Monroeville, Ind.

[73] Assignee: Dana Corporation, Toledo, Ohio

[21] Appl. No.: 360,970

[22] Filed: Dec. 21, 1994

[51] Int. Cl.⁶ ............................ F16D 25/10; F16D 25/04
[52] U.S. Cl. .............. 192/87.16; 92/100; 192/88 A; 192/85 V; 475/298
[58] Field of Search .................. 192/3.52, 3.59, 192/69.91, 88 A, 85 V, 86, 87.14, 87.16, 87.15; 475/138, 142, 143, 146, 298, 300; 92/100

[56] References Cited

U.S. PATENT DOCUMENTS

| | | | |
|---|---|---|---|
| 848,379 | 3/1907 | Lake | 192/88 A |
| 2,398,407 | 4/1946 | Brownyer | 192/87.14 X |
| 2,465,714 | 3/1949 | Elliott | 92/100 X |
| 2,651,316 | 9/1953 | Fageol | 92/100 X |
| 2,651,950 | 9/1953 | Schou | 475/138 |
| 2,668,610 | 2/1954 | Backus | 192/88 A X |
| 3,400,637 | 9/1968 | Roberts et al. | 92/100 X |
| 4,281,586 | 8/1981 | Kuhlen et al. | 92/100 X |
| 4,440,042 | 4/1984 | Holdeman . | |
| 4,747,463 | 5/1988 | Yoshinaka et al. | 180/247 |
| 4,858,716 | 8/1989 | Kano et al. | 192/85 V X |
| 4,960,038 | 10/1990 | Chiba et al. | 92/100 X |
| 5,106,351 | 4/1992 | Williams et al. | 475/250 |
| 5,123,293 | 6/1992 | Umemoto et al. | 74/333 |
| 5,226,860 | 7/1993 | Baxter, Jr. et al. | 475/206 |

FOREIGN PATENT DOCUMENTS 174247  3/1953  Austria ..................... 92/100

Primary Examiner—Rodney H. Bonck
Attorney, Agent, or Firm—Oldham & Oldham Co., LPA

[57] ABSTRACT

A vacuum operated speed range shifting mechanism for use in a drivetrain subassembly having input and output shafts, each being rotatably mounted within a support structure. The shifting mechanism comprises an annular shift sleeve surrounding and splined to the output shaft for rotation therewith, with the sleeve being axially moveable between first and second axial positions corresponding to low and high speed modes of operation of the drivetrain subassembly. The mechanism further includes a stationary annular housing disposed coaxially about the shift sleeve within the support structure. The housing is axially restrained by the support structure and defines an interior chamber. A flexible annular diaphragm is attached to the housing and disposed within the housing so as to divide the interior chamber into first and second annular cavities which are substantially hermetically sealed. A shift collar assembly is attached to the diaphragm and is disposed in surrounding relationship with the shift sleeve. In the preferred embodiment, evacuation of one of the first and second cavities and simultaneous venting of the other cavity to the atmosphere exerts a generally axial force on the shift collar assembly thereby forcing the shift sleeve to be disposed in one of the first and second axial positions to cause shifting to a desired drive mode.

19 Claims, 4 Drawing Sheets

VACUUM OPERATED SPEED RANGE SHIFTING MECHANISM

BACKGROUND OF THE INVENTION

1. Field of the Invention

The present invention relates generally to a vacuum operated speed range shifting mechanism and, more particularly to a mechanism which may be used to shift a torque transfer case of a four-wheel drive system into low and high range speed modes of operation.

2. Related Art

Four-wheel drive systems for vehicles typically include a torque transfer case which includes an input shaft connected to and driven by the output shaft of the vehicle main transmission, a rear output shaft connected to drive the rear wheels of the vehicle, a front output shaft connected to drive the front wheels of the vehicle, and means for drivingly connecting the input shaft to the front and rear output shafts. Conventional torque transfer cases typically include mechanisms for shifting between low and high speed range modes of operation, where the rear output shaft is directly connected to the input shaft during the high speed mode of operation and is connected to a planetary gear reduction set coupled to the input shaft during the low speed mode of operation. Known speed range shifting devices include asymmetric shift rails disposed within the torque transfer case and associated linkages and actuating means disposed externally to the case. Such systems are relatively expensive due to the linkages required and are at least partially exposed to the environment external of the transfer case. Another known shifting mechanism includes a shift sleeve collar mounted to the rear output shaft which is actuated by a linear screw arrangement coaxially disposed about the shift sleeve and driven by an electric motor. While this system eliminates the linkages of the aforementioned system, the included electric motor is relatively expensive and heavy.

In view of the deficiencies associated with the foregoing range speed shifting mechanisms, applicant's invention is in herein presented.

SUMMARY OF THE INVENTION

Accordingly, the present invention is directed to a vacuum operated speed range shifting mechanism for use in a vehicle drivetrain subassembly having an output shaft rotatably mounted within a support structure. According to a preferred embodiment, the shifting mechanism comprises an annular shift sleeve surrounding and splined to the output shaft for rotation therewith. The shift sleeve is axially moveable between a first axial position causing the output shaft to rotate at a first angular speed and a second axial position causing the output shaft to rotate at a second angular speed. The shifting mechanism further comprises a non-rotatable annular housing disposed coaxially about the shift sleeve within the support structure and restrained thereby, with the housing defining an interior chamber. A flexible annular diaphragm is attached at an outer end thereof to the housing, and is disposed within the housing so as to divide the interior chamber into first and second annular cavities which are substantially hermetically sealed. A shift collar assembly is attached to the diaphragm and is disposed in surrounding relationship with the shift sleeve. The shifting mechanism further comprises means for evacuating one of the first and second cavities and for venting the other of the first and second cavities to the atmosphere so as to exert an axial force on the shift collar assembly thereby forcing the shift sleeve to be disposed in one of the first and second axial positions.

BRIEF DESCRIPTION OF THE DRAWINGS

The structural features and functions of the present invention, as well as the advantages derived therefrom, will become apparent from the subsequent detailed description of the preferred embodiments when taken in conjunction with the accompanying drawings wherein.

DETAILED DESCRIPTION

Figure 1:
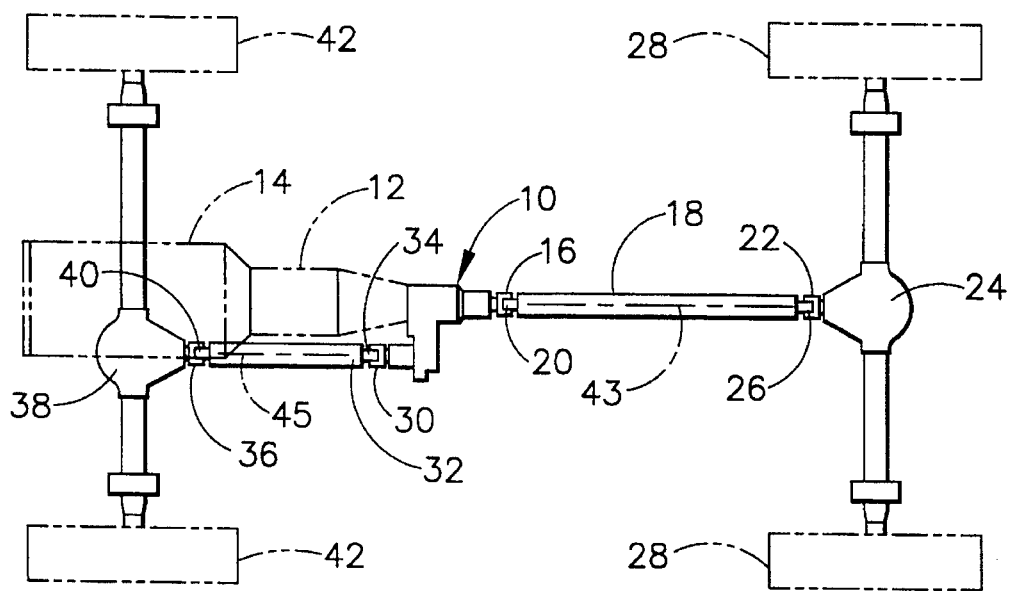
FIG. 1 is a plan view schematically illustrating the drivetrain components of a four-wheel drive vehicle including a torque transfer case which may incorporate the vacuum operated speed range shifting mechanism of the present invention.

Referring now to the drawings, FIG. 1 schematically illustrates a four-wheel drive system which includes a torque transfer case 10 which incorporates the vacuum operated speed range shifting mechanism (not shown in FIG. 1) of the present invention. As shown in FIG. 1, torque transfer case 10 is coupled with a conventional transmission unit 12 which in turn is coupled to a vehicle drive engine 14. Transfer case 10 includes a rear output shaft or yoke 16 connected to the forward end of a rear drive shaft 18 by means of a conventional universal joint coupling 20. The rearward end of the drive shaft 18 is coupled to an input shaft or yoke 22 of a rear differential 24 by means of a universal joint coupling 26. The rear differential 24 is adapted to divide torque from the rear drive shaft 18 between the rear wheels 28 of the vehicle.

Transfer case 10 is also provided with a front output shaft or yoke 30 which is drivingly connected to the rearward end of a vehicle front drive shaft 32 by means of a universal joint coupling 34. The front drive shaft 32 has a forward end connected to an input shaft or yoke 36 of a vehicle front differential unit 38 by means of a universal joint coupling 40 and is adapted to divide torque received from drive shaft 32 between the vehicle front wheels 42.

Figure 2:
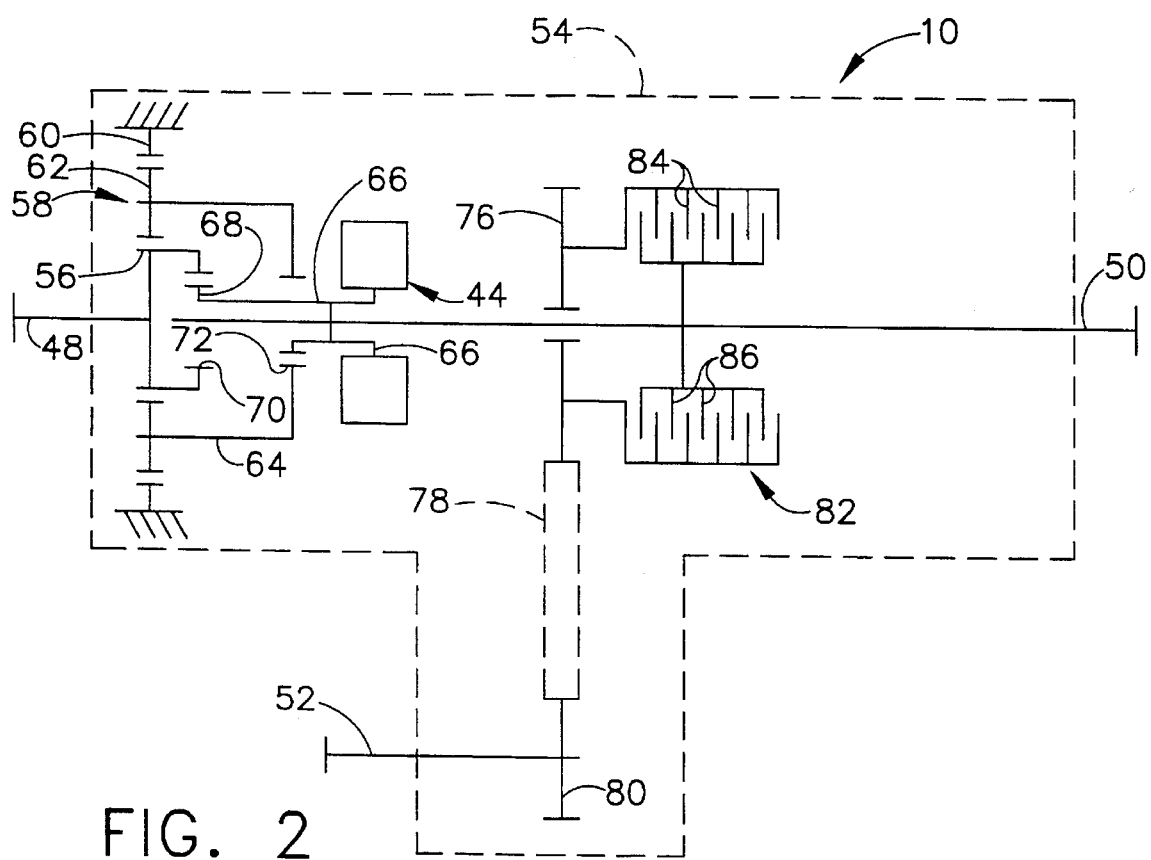
FIG. 2 is a view schematically illustrating the internal components of the torque transfer case shown in FIG. 1.

Referring now to FIG. 2, there is shown a schematic diagram of the internal components of the transfer case 10 of FIG. 1, which incorporates a vacuum operated speed range shifting mechanism, generally indicated at 44, according to the present invention. The transfer case 10 includes an input shaft 48 coupled to the output shaft (not shown) of the vehicle transmission 12 (shown in FIG. 1), a rear output shaft 50 for connection to the vehicle rear drive shaft 18, and a front output shaft 52 for connection to the vehicle front drive shaft 32. The input shaft 48 rotates about a longitudinal centerline axis 49 and is rotatably supported at the forward end of a transfer case housing 54. Shaft 48 incorporates a sun gear 56 which forms part of a planetary gear reduction set, generally indicated at 58, used to achieve the low speed operating range. Planetary gear set 58 includes a ring gear 60 which is fixed relative to housing 54, and a plurality of circumferentially spaced planet gears 62 which are individually rotatably supported by planet carrier 64. Rear output shaft 50 is rotatable about axis 49 and extends forwardly into housing 54. The vacuum operated speed range shifting mechanism 44 includes an annular shift sleeve 66 which surrounds and is splined to the forward end of output shaft 50, and is therefore rotatable with shaft 50 about axis 49. Sleeve 66 includes external splines 68 for engagement with either internal splines 70 connected to the input shaft 48, or internal splines 72 connected to the planet carrier 64. When shift sleeve 66 is disposed in a first, forward axial position so as to be connected to the input shaft 48, as illustrated below axis 49 in FIG. 3, there is a direct drive connection between input shaft 48 and the rear output shaft 50 causing shaft 50 to rotate at a first, relatively high speed thereby defining the high speed range of operation of transfer case 10. When shift sleeve 66 is disposed in a second, axially aft position so as to be connected to planet carrier 64, as shown above axis 49 in FIG. 3, the planetary gear set 58 introduces a predetermined gear reduction causing output shaft 50 to rotate at a second relatively low speed thereby defining the low speed range of operation of transfer case 10.

Transfer case 10 includes the following conventional components, which do not form a part of the present invention, which may be used to distribute torque between the front and rear wheels of the vehicle as follows. The transfer case 10 further comprises a first drive sprocket 76 which is rotatably supported on a central portion of the rear output shaft 50 and is connected by a drive chain 78 to drive a second drive sprocket 80 which is rotatably supported within transfer case housing 54 and connected to drive the front output shaft 52. A multi-disc four-wheel drive clutch, generally indicated at 82, is provided to control torque input to the front output shaft 52, and includes a first group of clutch plates 84 which, while axially movable, are secured for rotation with the first drive sprocket 76. A second group of clutch plates 86 are secured for rotation with the rear output shaft 50, and are also axially movable. Four-wheel drive clutch 82 is actuated by conventional means (not shown) which may be used in conjunction with a microprocessor-based electronic control system (not shown). When clutch 82 is disengaged the vehicle is operated in a two-wheel drive mode, with all the driving torque directed to the rear wheels of the vehicle via output shaft 50, vehicle rear drive shaft 18 and rear differential 24. When clutch 82 is fully engaged, a direct drive connection is provided between rear output shaft 50 and front output shaft 52 so that torque is distributed to the front and rear wheels of the vehicle based upon the traction available at each wheel.

Figure 3:
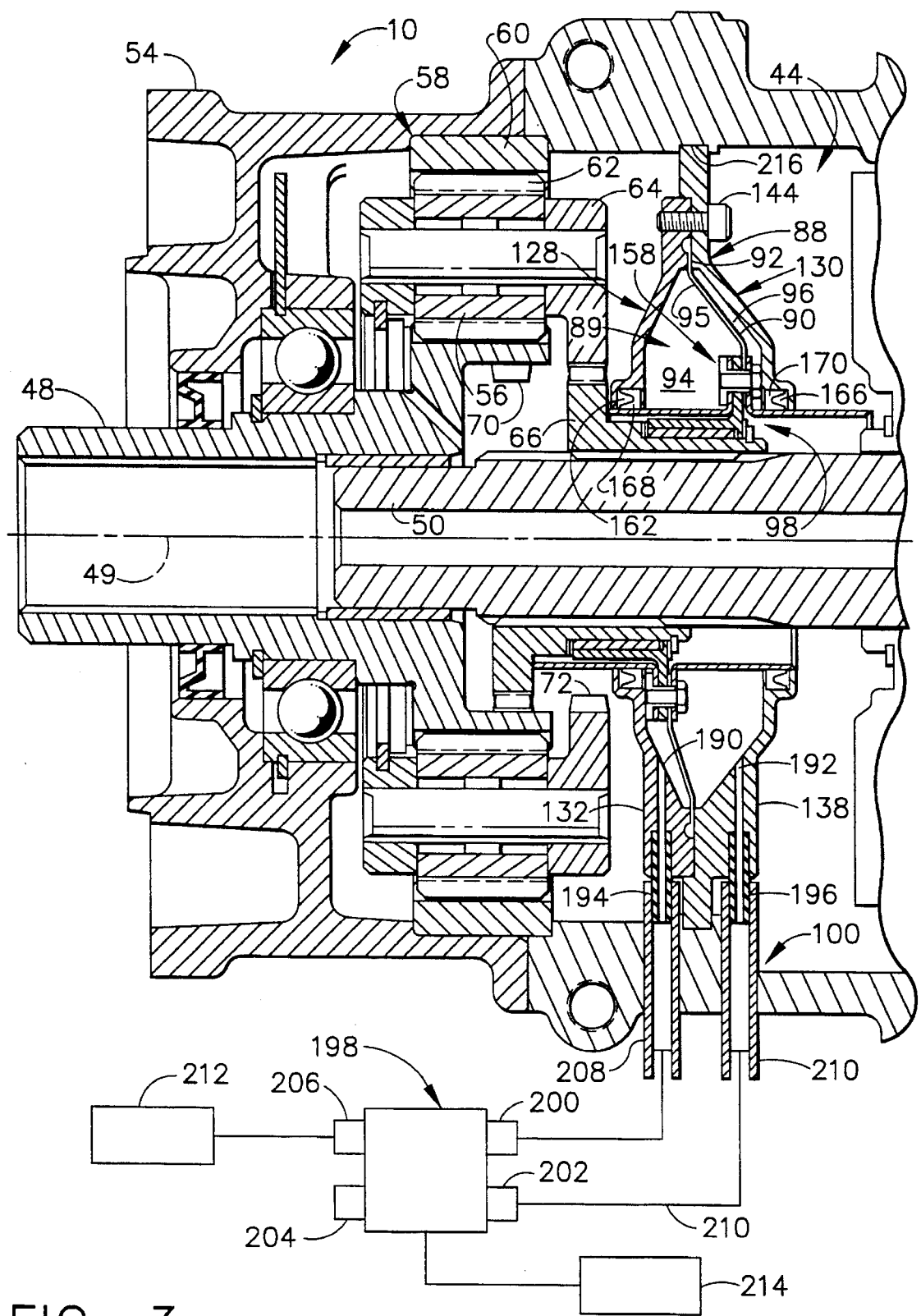
FIG. 3 is a partial longitudinal sectional view illustrating the torque transfer case schematically depicted in FIGS. 1 and 2.
Figure 4:
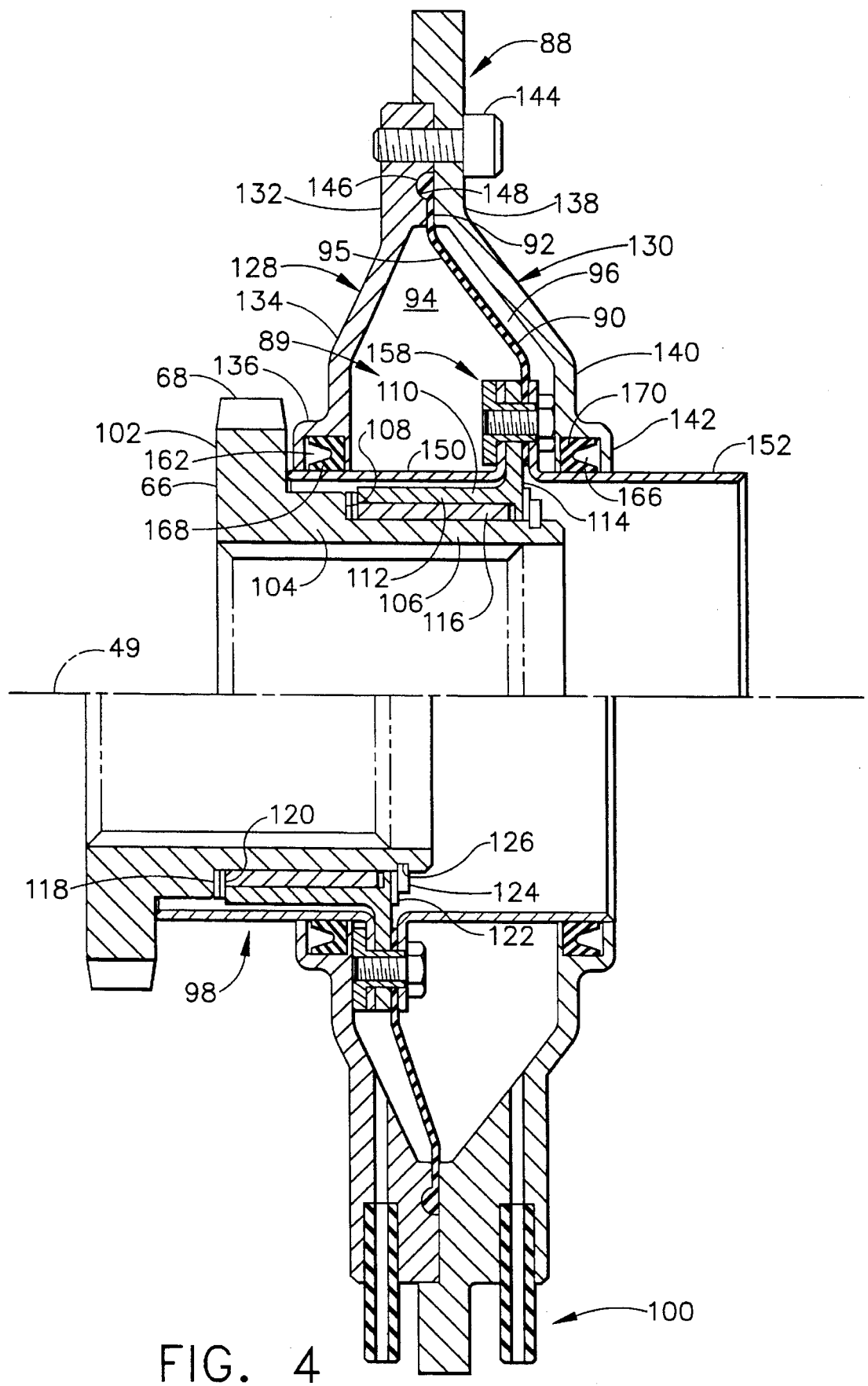
FIG. 4 is an enlarged longitudinal sectional view illustrating the vacuum operated speed range shifting mechanism shown in FIG. 3.
Figure 5:
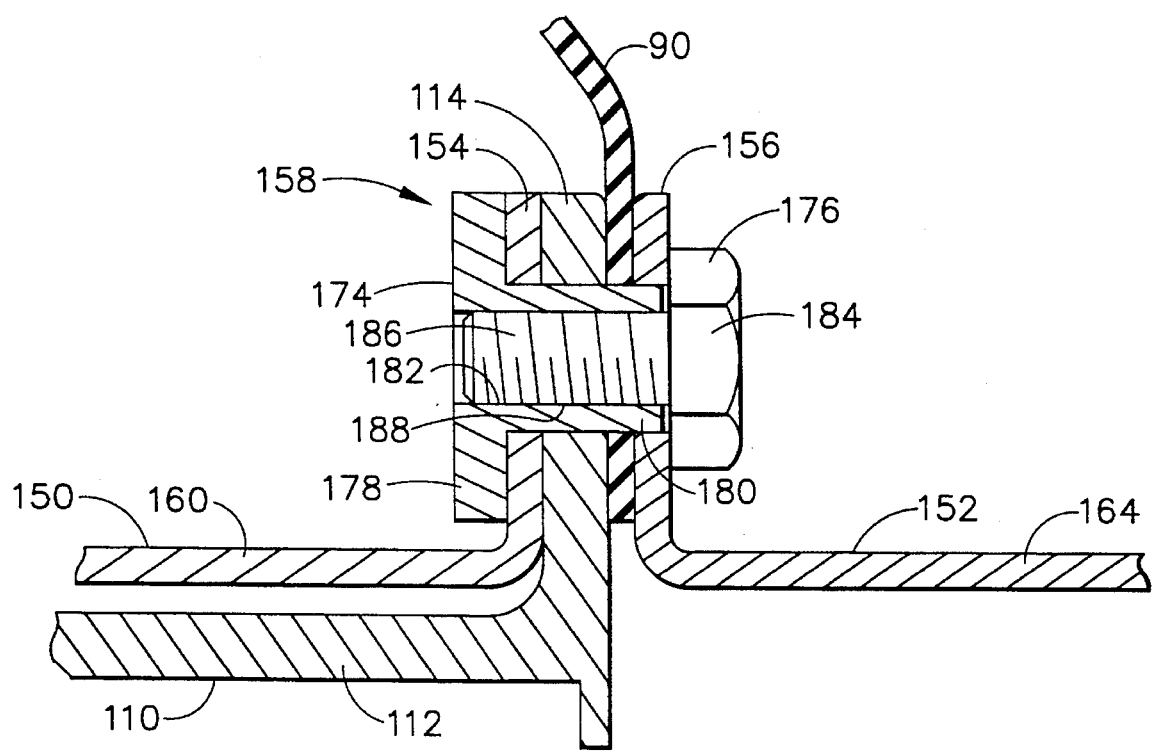
FIG. 5 is an enlarged view of illustrating a fastening means included in the speed range shifting mechanism of the present invention.

Referring now to FIGS. 3–5, the specific construction of the vacuum operated speed range shifting mechanism 44 is discussed in greater detail. In addition to shift sleeve 66, speed range shifting mechanism 44 further includes a non-rotatable annular housing 88 which is disposed coaxially about shift sleeve 66 within transfer case housing 54. Housing 88 is axially restrained by transfer case housing 54 and defines an interior chamber 89. Mechanism 44 further includes a flexible annular diaphragm 90 having an outer portion 92 attached to housing 88 and disposed within housing 88 so as to divide interior chamber 89 into first and second annular cavities 94 and 96, respectively. Cavities 94 and 96 are substantially hermetically sealed, as discussed subsequently in greater detail. A shift collar assembly, generally indicated at 98, is attached to diaphragm 90 and is disposed in surrounding relationship with shift sleeve 66. Mechanism 44 further includes a means, generally indicated at 100, for evacuating one of the cavities 94 and 96 and for simultaneously venting the other of cavities 94 and 96 to atmosphere. The pressure differential between cavities 94 and 96, and the resultant generally axial force acting on diaphragm 90, shift collar assembly 98 and other elements of mechanism 44 as subsequently described, results in sleeve 66 being disposed in one of the axial positions illustrated above and below axis 49 in FIGS. 3 and 4. Other arrangements to provide the pressure differential between cavities 94 and 96 are contemplated in the invention.

Shift sleeve 66 includes a radially extending flange portion 102 having external splines 68 formed on an outer end thereof. Sleeve 66 further includes a first generally cylindrical portion 104 attached to and extending axially aftward from flange portion 102, and a second generally cylindrical portion 106 attached to and extending axially aftward from the first cylindrical portion 104. The diameter of cylindrical portion 104 is greater than the cylindrical portion 106 of sleeve 66. An annular, radially extending shoulder 108 is formed between cylindrical portions 104 and 106. Shift collar assembly 98 comprises a radially outward shift collar 110 having an axially extending, generally cylindrical portion 112 and a radially extending flange portion 114 attached to cylindrical portion 112. Shift collar assembly 96 further includes a radially inward and generally cylindrical bushing 116 which is pressed into the cylindrical portion 112 of shift collar 110, so as to engage shift collar 110 in an interference fit. The flange portion 114 of shift collar 110 is attached to diaphragm 90 as subsequently discussed in greater detail. Mechanism 44 further includes annular thrust bearings 118, 120 and 122 which are disposed in surrounding relationship with cylindrical portion 106 of sleeve 66. Mechanism 44 further comprises an annular snap ring 124 disposed in an annular groove 126 formed in cylindrical portion 106 of shift sleeve 66. Thrust bearings 118 and 120 are axially adjacent one another and are disposed axially between shoulder 108 of sleeve 66 and shift collar assembly 98. Thrust bearing 122 is disposed axially between snap ring 124 and shift collar assembly 98. Accordingly, shift collar assembly is disposed axially between thrust bearings 120 and 122.

Annular housing 68 comprises front and rear portions 128 and 130, respectively. Front portion 128 includes a radially outward flange 132 and a radially inwardly extending leg portion 134 which is attached to flange 132 and terminates in a radially inwardly facing U-shaped channel 136. Rear portion 130 of housing 88 includes a radially outward flange 138 and a radially inwardly extending leg portion 140 attached to flange 138 and terminating in a radially inwardly facing U-shaped channel 142. Flanges 132 and 138 are fastened to one another using conventional means such as bolts 144 (only one shown). The outer portion 92 of diaphragm 90 is disposed axially between flanges 132 and 138 and is therefore clamped between flanges 132 and 138 when bolts 144 are torqued. The outer portion 92 of diaphragm 90 terminates in an annular rib 146 which is disposed in an annular groove 148 formed in flange portion 132 of the front portion 128 of housing 88. Rib 146 is preferably bonded, using conventional adhesives, within groove 148 which further secures the position of outer portion 92 of diaphragm 90 between flanges 132 and 138.

The shifting mechanism 44 further comprises annular sealing sleeves 150 and 152 having flange portions 154 and 156, respectively, which are attached to the shift collar assembly 98 and diaphragm 90 using a fastening means generally indicated at 158. Sealing sleeve 150 further includes a cylindrical portion 160 which is disposed in surrounding relationship with the shift collar 110 and extends axially forward from flange 154 so as to cooperate with U-shaped channel 136 to form an axially forward, inner annular receptacle 162. Similarly, sealing sleeve 152 includes a cylindrical portion 164 which extends axially aftward from flange portion 156 so as to cooperate with U-shaped channel 142 to form an axially aftward, inner annular receptacle 166. Resilient, annular seals 168 and 170 are disposed in chambers 162 and 166, respectively. Seals 168 and 170 preferably have a V-shaped cross-section, as shown in FIG. 3, and are preferably made of elastomeric material. Seal 168 is disposed in sealing engagement with sealing sleeve 150 and the U-shaped channel 136 of front portion 128 of housing 88. Seal 170 is disposed in sealing engagement with sealing sleeve 152 and the U-shaped channel 142 of the rear portion 130 of housing 88. The outer surfaces of cylindrical portions 160 and 164 of sealing sleeves 150 and 152, respectively, are manufactured with very smooth surface finishes so as to enhance the sealing engagements with seals 168 and 170. The use of seals 168 and 170, in combination with the attachment of outer portion 92 of diaphragm 90 to flanges 132 and 138 and the attachment of diaphragm 90 to sealing sleeves 150 and 152 and shift collar 110, allow cavities 94 and 96 of housing 88 to be substantially hermetically sealed.

Referring now to FIG. 5, the manner in which diaphragm 90, shift collar 110 and sealing sleeves 150 and 152 are attached to one another using the fastening means 158, as well as the particular construction of fastening means 158 will be discussed in greater detail. In addition to fastening the aforementioned components together, the constituent elements of fastening means 158 serve the function of axial stops, in either a forward or aft direction, thereby limiting the axial travel of diaphragm 90, shift collar 110 and sealing sleeves 150 and 152. Fastening means 158 comprises a plurality of bushings 174 and a corresponding plurality of bolts 176, with the number of bushings 174 and bolts 176 being equal to one another. The number of bushings and bolts required are dependent upon the particular application and are anticipated to be in the range of 3 to 5. Although greater numbers of bushings and bolts are considered to be within the scope of the present invention, fewer numbers are not acceptable as this would compromise the ability to hermetically seal cavities 94 and 96. Each bushing 174 has a head portion 178 and a cylindrical portion 180 attached to head portion 178, with cylindrical portion 178 having internal threads 182. Each bolt 176 includes a head portion 184 and a shank portion 186 having external threads 188, with shank portion 186 being attached to head portion 184. The cylindrical portion 180 of each bushing is inserted into holes formed in flange 154 of sealing sleeve 150, flange 114 of shift collar 110, the inner portion of diaphragm 90, and flange 156 of sealing sleeve 152. The shank portion 186 of each bolt 176 threadingly engages the cylindrical portion 180 of a corresponding one of bushings 174. Bolts 176 are torqued so as to permit cavities 94 and 96 to be substantially hermetically sealed. The axial stopping function of fastening means 158 will be discussed further in conjunction with the discussion of the operation of mechanism 44.

The evacuating means 100 comprises a flow passage 190 extending radially through a locally enlarged portion of flange 132 of the front portion 128 of housing 88 with an inner end of flow passage 190 in fluid flow communication with cavity 94 within housing 88. Means 100 further includes a flow passage 192 which extends radially through a locally enlarged portion of flange 138 of the rear portion 130 of housing 88, with an inner end of passage 192 being in fluid flow communication with cavity 96. Flow passages 190 and 192 each include an enlarged diameter outer portion for receiving hollow flexible tubes 194 and 196, respectively. Tubes 194 and 196 are preferably made of plastic and are bonded, by conventional means, within the enlarged outer portions of passages 190 and 192, respectively. Means 100 further includes a valve means indicated generally at 198, having inlet ports 200 and 202 and outlet ports 204 and 206. Hollow tube 208 is fluidly coupled between flow passage 190 and valve means 198, with a first end of tube 208 being attached to flexible tube 194 and a second end of tube 208 being attached to inlet 200 of valve means 198. Similarly, tube 210 fluidly couples flow passage 192 and valve means 198, with a first end of tube 210 being attached to flexible tube 196 and a second end of tube 210 being attached to inlet 202 of valve means 198. Outlet port 204 of valve means 198 is vented to the atmosphere surrounding transfer case 10 and outlet port 206 is fluidly coupled to a vehicle vacuum source 212. Valve means 198 may comprise a single four-way, electrically operated valve which is actuated by a two-position switch 214, as illustrated in FIG. 3, or alternatively, may comprise a pair of valves which are suitably configured, one being connected to each of the tubes 208 and 210. When switch 214 is in a "low speed" position, inlet port 200 is fluidly coupled with to outlet port 204 and inlet port 202 is fluidly coupled with outlet port 206. Accordingly, valve means 198 may operably fluidly couple flow passage 190 with the atmosphere surrounding transfer case 10, and may simultaneously fluidly couple flow passage 192 with vacuum source 212. In this manner, cavity 96 is substantially evacuated and cavity 94 is pressurized to atmospheric pressure. The differential pressure existing between cavities 94 and 96 results in an aftward, generally axial force acting on the shift collar assembly 98 as well as flanges 154 and 156 and the unrestrained central portion 95 of diaphragm 90. When switch 214 is in the "high speed" position, inlet port 200 is fluidly coupled with outlet port 206 and inlet port 202 is fluidly coupled with outlet port 204. Accordingly, valve means 198 fluidly couples flow passage 192 with the atmosphere surrounding transfer case 10 and simultaneously fluidly couples flow passage 190 with the vacuum source 212. In this manner, cavity 94 is substantially evacuated while cavity 96 is simultaneously pressurized to atmospheric pressure. In this case, the differential pressure between cavities 96 and 94 results in a forward, generally axial force acting on the shift collar assembly 98 as well as flanges 154 and 156 and the unrestrained central portion 95 of diaphragm 90. Since diaphragm 90, shift collar 110, and sealing sleeves 150 and 152 are fastened to one another and since diaphragm 90 is relatively flexible, the aforementioned aftward and forward axial forces cause shift collar 110, sealing sleeves 150 and 152 and the inner portion of diaphragm 90 to translate to the corresponding one of the axial positions illustrated in FIGS. 3 and 4. Due to the interrelationship existing among shift sleeve 66, shift collar assembly 98, thrust bearings 118, 120 and 122, and snap ring 124, shift sleeve 66 is forced to translate with shift collar assembly 98 to either the forward or aft axial position illustrated in FIGS. 3 and 4. The radially outermost portion of flange 138 of rear portion 130 of housing 88 is disposed in an annular groove 216 formed in housing 54 of transfer case 10. The aforementioned axial forces also urge flange 138 against either the forward or aft sidewall of groove 216 thereby axially restraining housing 88 and reacting the aforementioned forces through housing 54. It should be understood, that the particular type of valve or valves used is unimportant provided that valve means 198 is capable of evacuating cavity 94 while simultaneously pressurizing cavity 96 to atmospheric pressure and additionally, is capable of evacuating cavity 96 while simultaneously pressurizing cavity 94 to atmospheric pressure. Alternatively, a pressure differential may be created between cavities 94 and 96 by pressurizing one of the cavities above atmospheric pressure while simultaneously venting the other cavity to atmosphere. In this instance, flow passages 190 and 192 may be fluidly coupled with valve means 198 such that one of the passages is connected to a source of pressure, while the other is vented to atmosphere. It should be further understood that additional flow passages, similar to passage 190, may be formed radially through flange 132 and additional flow passages, similar to passage 192, may be formed radially through flange 138. In this instance, the plural flow passages would be fluidly coupled, or placed in fluid flow communication, with valve means 198 in such a manner to permit the evacuation or pressurization of one of cavities 94 and 96, while simultaneously venting the other of cavities 94 and 96 to atmospheric pressure.

In operation, when a "low speed" mode of operation is desired, the vehicle operator selects the "low speed" position of switch 214. This results in flow passage 192 being fluidly coupled, through valve means 198, to vacuum source 212 which results in the evacuation of cavity 96. Flow passage 190 is simultaneously fluidly coupled, through valve means 198, to the atmosphere surrounding torque transfer case 10 which results in cavity 94 being pressurized to atmospheric pressure. Due to the pressure differential existing between cavities 94 and 96, shift collar 110 and sealing sleeves 150 and 152 and the inner portion of diaphragm 90 are translated axially aftward until the heads 184 of bolts 176 contact the rear portion 130 of housing 88. It is noted that the same result could be achieved by evacuating cavity 94 and simultaneously pressurizing cavity 96 above atmospheric pressure. Due to the press fit between bushing 116 and shift collar 110, bushing 116 translates with shift collar 110. When shift collar 110 is translated axially aftward, shift collar 110 forces thrust bearing 122 against snap ring 124, causing a corresponding aftward translation of shift sleeve 66 to the position illustrated above axis 49 in FIGS. 3 and 4. In this position, the external splines 68 of sleeve 66 engage the internal splines 72 formed on planet carrier 64, causing output shaft 50 to rotate at an angular speed which is reduced relative to that of input shaft 48. When the "high speed" mode of operation is desired, the vehicle operator selects the "high speed" position of switch 214 causing flow passage 192 to be fluidly coupled with atmosphere while simultaneously causing flow passage 190 to be fluidly coupled with vacuum source 212. Accordingly, cavity 94 is substantially evacuated while cavity 96 is vented to atmospheric pressure. Due to the pressure differential existing between cavities 96 and 94 the inner portion of diaphragm 90, shift collar 110 and sealing sleeves 150 and 152 are translated axially forward until the head portions 178 of bushings 174 contact the forward portion 128 of housing 88. It is noted that the same result may be achieved by venting cavity 94 to atmosphere while simultaneously pressurizing cavity 96 to a pressure above atmospheric pressure. The forward translation of shift collar 110 and bushing 116 causes fork 110 and bushing 116 to be in contacting engagement with thrust bearing 120 and forces thrust bearing 118 against shoulder 108 of sleeve 66, causing a corresponding axially forward translation of sleeve 66 to the position illustrated below axis 49 in FIGS. 3 and 4. In this position, the external splines 68 of sleeve 66 engage the internal splines 70 formed on input shaft 48, thereby providing a direct drive connection between shafts 48 and 50 which rotate at the same speed.

While the foregoing description has set forth the preferred embodiments of the invention in particular detail, it must be understood that numerous modifications, substitutions and changes can be undertaken without departing from the true spirit and scope of the present invention as defined by the ensuing claims. For instance, the speed range shifting mechanism of the present invention may be utilized in torque transfer cases which are configured differently than the one illustrated in FIGS. 2 and 3. Additionally, the speed range shifting mechanism of the present invention may be utilized in transmissions or two-speed axles. The invention is therefore is not limited to specific preferred embodiments as described but is only limited as defined by the following claims.

What is claimed is:

1. A speed range shifting mechanism comprising:

an annular shift sleeve surrounding and splined to a first shaft for rotation therewith, said shift sleeve being axially moveable between a first axial position causing said first shaft to rotate at a first angular speed and a second axial position causing said first shaft to rotate at a second angular speed;

a non-rotatable annular housing disposed coaxially about said shift sleeve within a support structure, said housing being axially restrained by said support structure, wherein said housing defines an interior chamber;

a flexible annular diaphragm having an outer portion attached to said housing, said diaphragm disposed within said housing so as to divide said interior chamber into first and second annular cavities, wherein said first and second cavities are substantially sealed;

a non-rotatable shift collar assembly attached to said diaphragm and positioned about said shift sleeve in movable engagement therewith; and means for evacuating one of said first and second cavities and for simultaneously venting the other of said first and second cavities so as to exert a generally axial force on said diaphragm and correspondingly on said shift collar assembly thereby engaging and moving said shift sleeve to be disposed in one of said first and second axial positions;

wherein said evacuating and venting means comprises a plurality of flow passages formed in said housing.

2. The shifting mechanism as recited in claim 1, wherein, said shift sleeve comprises a radially extending flange portion having a plurality of external splines formed on a first end thereof, and including at least a first generally cylindrical portion extending axially from said flange portion, with said shift collar being movably retained with said cylindrical portion;

wherein said external splines engage a second shaft for rotation therewith when said shift sleeve is in said first axial position and engage a reduction gear member when said shift sleeve is in the second axial position.

3. The shifting mechanism as recited in claim 1, wherein, said shift collar assembly comprises:

a radially outward shift collar having an axially extending generally cylindrical portion and a radially extending flange portion attached to said cylindrical portion; and a radially inward and generally cylindrical bushing which is pressed into said cylindrical portion of said shift collar;

wherein said flange portion of said shift collar is attached to said diaphragm.

4. The shifting mechanism as recited in claim 3, further comprising, first, second and third thrust bearings disposed in surrounding relationship with said second cylindrical portion of said shift sleeve; and an annular snap ring disposed in an annular groove formed in said second cylindrical portion of said shift sleeve;

wherein said first and second thrust bearings are axially adjacent one another and disposed axially between said shoulder of said shift sleeve and said shift collar assembly;

wherein said shift collar assembly is disposed axially between said second and third thrust bearings;

wherein said third thrust bearing is disposed axially between said shift collar assembly and said snap ring.

5. The shifting mechanism as recited in claim 1, wherein, said housing comprises:

a front portion having a radially outward flange and a radially inwardly extending leg portion attached to said flange; and a rear portion having a radially outward flange and a radially inwardly extending leg portion attached to said flange of said rear portion;

wherein said flange of said front portion is fastened to said flange of said rear portion; wherein said outer portion of said diaphragm is clamped between said flange of said front portion and said flange of said rear portion.

6. The shifting mechanism as recited in claim 5, wherein, said leg portion of said front portion of said housing terminates in a first radially inwardly facing U-shaped channel;

said leg portion of said rear portion of said housing terminates in a second radially inwardly facing U-shaped channel.

7. The shifting mechanism as recited in claim 6, further comprising, first and second sealing sleeves each having a flange portion attached to said shift collar assembly and said diaphragm and a generally cylindrical portion attached to and extending axially from the corresponding one of said flange portions;

wherein said cylindrical portion of said first sealing sleeve is disposed in surrounding relationship with said shift collar and extends axially forward from said flange of said first sealing sleeve so as to cooperate with said first U-shaped channel to form an axially forward inner annular receptacle;

wherein said cylindrical portion of said second sealing sleeve extends axially aftward from said flange portion of said second sealing sleeve so as to cooperate with said second U-shaped channel to form an axially aftward inner annular receptacle.

8. The shifting mechanism as recited in claim 7, further comprising, a first resilient seal disposed in said forward inner receptacle in sealing engagement with said first sealing sleeve and said front portion of said housing;

a second resilient seal disposed in said aftward inner receptacle in sealing engagement with said second sealing sleeve and said rear portion of said housing.

9. The shifting mechanism as recited in claim 8, wherein, said first and second seals have generally V-shaped cross-sections and are made of elastomeric material.

10. The shifting mechanism as recited in claim 8, wherein, said shift collar assembly comprises a radially outward shift collar having a radially extending flange extending within said housing;

said flanges of said shift collar and said first and second sealing sleeves fastened to one another and to said diaphragm.

11. The shifting mechanism as recited in claim 10, further comprising, a plurality of bushings, each of said bushings having a head portion and a cylindrical portion attached to said head portion, said cylindrical portion having internal threads; and a plurality of bolts, each of said bolts having a head portion and a shank portion having external threads;

wherein said cylindrical portion of each of said bushings is inserted into holes formed in said flange portion of said first and second sealing sleeves and said shift collar and a hole formed in said diaphragm;

wherein said shank portion of each of said bolts threadingly engages said cylindrical portion of a corresponding one of said bushings;

wherein said head portion of each of said bushings contacts said front portion of said housing when said shift collar assembly is translated axially forward so as to force said shift sleeve to move to a forward one of the first and second axial positions;

wherein said head of each of said bolts contacts said rear portion of said housing when said shift collar assembly is translated axially rearward so as to force said shift sleeve to move to a rear one of the first and second axial positions.

12. The shifting mechanism as recited in claim 5, wherein, said outer portion of said diaphragm terminates in an annular rib which is disposed in an annular groove formed in said flange portion of said front portion of said housing;

said rib is bonded within said groove.

13. The shifting mechanism as recited in claim 5, wherein, said evacuating and venting means further comprises at least one valve;

said plurality of flow passages comprises at least one passage in fluid flow communication with said first cavity and said valve and at least a second passage in fluid flow communication with said second cavity and said at least one valve;

said at least one valve may operably fluidly couple said at least one passage with a vacuum source disposed externally of the support structure and vent said at least a second passage so as to substantially evacuate said first cavity and exert a first, generally axial force on said shift collar assembly;

said at least one valve may operably fluidly couple said at least a second passage with the vacuum source and vent said at least one passage so as to evacuate said second cavity and exert a second, generally axial force on said shift collar assembly, said first and second axial forces acting in opposite directions.

14. The shifting mechanism as recited in claim 13, wherein, said at least one passage extends radially through said flange portion of said front portion of said housing and is in fluid flow communication with a forward one of said first and second cavities;

said at least a second passage extends radially through said flange portion of said rear portion of said housing and is in fluid flow communication with a rear one of said first and second cavities.

15. The shifting mechanism as recited in claim 14, wherein, said evacuating and venting means further comprises a plurality of hollow flexible tubes and wherein each of said tubes is bonded within an enlarged outer portion of one of said flow passages.

16. An actuator shift mechanism comprising:

an annular shift sleeve, said shift sleeve being axially moveable between a first axial position and a second axial position;

a non-rotatable annular housing disposed coaxially about said shift sleeve, wherein said housing defines an interior chamber;

a flexible annular diaphragm having an outer portion attached to said housing, said diaphragm disposed within said housing so as to divide said interior chamber into first and second annular cavities, wherein said first and second cavities are substantially sealed;

an annular, non-rotatable shift collar assembly attached to said diaphragm and disposed in surrounding relationship with said shift sleeve and movably engaged therewith; and a pressurizing mechanism creating a pressure differential in one of said first and second cavities so as to exert a generally axial force on said diaphragm within said interior chamber causing movement of said diaphragm and corresponding axial movement of said shift collar assembly thereby moving said shift sleeve to one of the first and second axial positions.

17. The actuator shift mechanism as recited in claim 16, wherein said non-rotatable annular housing comprises:

radially inwardly extending sidewall members; and first and second sealing members associated with each of said extending sidewall member to substantially seal said housing with respect to said shift collar assembly as said shift collar assembly is moved axially.

18. The actuator shift mechanism as recited in claim 17, wherein:

said first and second sealing members include sealing sleeves attached to said shift collar assembly each extending axially adjacent the bottom of said housing; and first and second resilient seals;

wherein said axially extending portions of said first and second sealing sleeves are disposed in surrounding relationship with said shift collar; and wherein said first and second resilient seals are disposed within the ends of said extending sidewall members in sealing engagement with said first and second sealing sleeves and said extending sidewall members.

19. The actuator shift mechanism as recited in claim 16, wherein, said pressurizing mechanism comprises an evacuation and venting mechanism including a plurality of flow passages further comprises at least one valve;

said plurality of flow passages comprises at least one passage in fluid flow communication with said first cavity and said valve and at least a second passage in fluid flow communication with said second cavity and said at least one valve;

said at least one valve operably fluidly coupling said at least one passage with a vacuum source disposed externally of said support structure and venting said at least a second passage so as to substantially evacuate said first cavity and exert a first, generally axial force on said shift collar assembly;

said at least one valve may operably fluidly couple said at least a second passage with said vacuum source and vent said at least one passage so as to evacuate said second cavity and exert a second, generally axial force on said shift collar assembly, said first and second axial forces acting in opposite directions.

* * * * *